UNITED STATES PATENT OFFICE 2,515,218

POLYMERIZATION OF ROSIN USING ACTIVATED EARTHS

Burt L. Hampton, Jacksonville, Fla., assignor, by mesne assignments, to The Glidden Company, Cleveland, Ohio, a corporation of Ohio No Drawing. Application September 21, 1946, Serial No. 698,431

16 Claims. (Cl. 260—99.5)

The present invention relates to the polymerization of gum and wood rosin and to the polymerization of the pure resin acids.

It is already known that hydrosilicate earths such as fuller's earth, "Tonsil," Florida earth and the like, when activated with hydrohalic acid, are effective in promoting the decomposition of rosin into oils when the earth and rosin are heated to temperatures above about 155° C. This use of activated earth is disclosed in United States Patent 1,952,233.

I have now discovered, however, that if rosins or resin acids in liquid phase are heated with certain activated earths at temperatures lower than about 155° C. but above about 50° C., polymerization of the rosins or resin acids may be effected with a resulting increase of from 4 to 20° C. in the melting point of the rosin or resin acid.

It accordingly is an object of this invention to provide a new process for the polymerization of rosin.

It is a further object of the invention to provide a polymerization process for rosins and resin acids which employs a new class of catalyst.

These and other objects will be apparent from the following description of the invention.

Various activated earths have been used in the past in numerous catalytic processes among which have been processes for effecting the polymerization of acyclic terpenes, dipolymer, turpentine and pine oil. Earths have also been employed in connection with rosins and various terpenes to effect improvements in color. The present invention is not concerned with such uses of earths or activated earths, but instead is directed to the use of certain activated earths in effecting the polymerization of gum and wood rosins, and the pure resin acids.

I have found that various argillaceous materials of extensive surface and porosity, such as the various kaolinization products of rock minerals such as rottenstone, bentonite, montmorillonite, New Jersey clay, fuller's earth, bauxite, etc., become effective polymerization catalysts when activated with hydrochloric or hydrobromic acid. By New Jersey clay is meant an untreated clay and having characteristics of clays found in Camden and Burlington counties, New Jersey, and is an aluminum silicate clay containing approximately 47% alumina, about 45½% silica and small amounts of various metal oxides. As will be recognized from the literature, the other earths mentioned above are of analogous nature, although exemplifying a broad range of aluminous and siliceous proportions. Porosity and great surface are apparently important factors which aid in determining the effectiveness of the activated catalysts, and while I do not wish to be limited by the theory which I here express, I believe that it is the lack of these characteristics which, together with the natural basicity of some earths, accounts, at least in part, for the ineffectiveness of certain earths and kaolinized rock minerals. For example, feldspars combined with otherwise activating amounts of either hydrochloric or hydrobromic acids have been found to be ineffective in promoting polymerization of rosins or resin acids. Similarly, pyrophyllite (a hydrous aluminum silicate) has been found to be ineffective although its chemical structure and composition should theoretically make it as satisfactory as the other hydrous aluminum silicates mentioned above.

Broadly my improved process involves contacting the rosins or resin acids in liquid phase with acid-activated catalysts of the nature described above for a period sufficiently long to give a substantial yield of polymerized product without employing temperatures which promote decomposition or appreciable decarboxylation. Thereafter the reaction mixture is washed with dilute acid, the catalyst is separated from the mixture by any convenient means, as by filtration, the filtrate is washed with water, and the polymerized product is recovered.

In this process, amounts of catalyst from about .2% to about 20% by weight of the rosin or resin acids have been found to be effective. Under my preferred conditions, however, amounts of about 1% to 4% are adequate. As indicated previously, the catalyst is activated by means of small amounts of hydrochloric acid or hydrobromic acid, and I have found that amounts of these acids of between about .2% and 5% by weight of the rosin are useful. Again, however, my preferred conditions permit the use of amounts between about .2% and 2%.

The rosins or resin acids may be contacted with the catalyst either in the molten condition, or in the form of a solution of the rosin or resin acids in a suitable inert solvent. Many inert solvents for rosin are known to those skilled in the art, but for purposes of example the following are mentioned: mineral spirits, glacial acetic acid, benzene, toluene, xylene, chlorobenzene, and ethylene chloride. Where solutions are employed, the rosin or resin acid content thereof may range from about 30% to 100%, with a content of about 80% preferred for most purposes.

The polymerization treatment with activated catalysts of the kind mentioned and in the amounts named may be carried on at temperatures between about 50° C. and 155° C. when solutions of rosin are treated, and from the melting point of the rosin or resin acid to about 155° C. when no solvent is employed. The period of the treatment over this range of temperatures varies considerably with the nature of the rosin or resin acid to be polymerized and with the activity of the catalyst, but I have found that a period of from about 1 hour to about 100 hours is useful. Under my preferred conditions, however, treatments lasting from 1 hour to about 30 hours produce commercially advantageous results.

Rosin generally contains some oxidized products and upon addition of the activating hydrohalic acid small quantities of water are formed. Also, the catalyst may contain moisture either sorbed therein or chemically combined therewith in a loose manner such that it is evolved therefrom under the conditions of treatment. Moreover oxidic constituents or impurities in the catalyst may react with the activating hydrohalic acid to generate water. The removal from the rosin or resin solution of water from such sources is not essential to effect polymerization, but for producing the more highly polymerized materials, it is advantageous to remove such water as well as any water contained in the rosin or resin solution.

It should be recognized that the activating hydrohalic acid may be added in any usual or convenient form of the compound per se. However, it may also be generated in situ by using materials which produce hydrochloric acid or hydrobromic acid under the conditions of treatment. Hydrogen-chloride producing compounds and hydrogen-bromide-producing compounds are well known to those skilled in the art, but for purposes of example, the following materials are mentioned: chlorine, phosphorous chlorides, phosphorous bromides, benzoyl chloride, acetyl chloride and other organic acid chlorides and bromides. The reactions which are involved in producing hydrohalic acids from these and like materials are well understood by those skilled in the art but for purposes of reference, mention is made of "An Outline of Organic Chemistry" by Degering (4th edition, published in 1941) where typical reactions of such materials with aliphatic and aromatic compounds are explained on pages 37 and 185–187, respectively.

According to a preferred procedure, a solution of rosin is first formed in an inert solvent such as mineral spirits. A small quantity of porous earth catalyst of large surface, such as rottenstone, is then added together with a small quantity of hydrochloric acid sufficient to provide at least about .2% of free hydrochloric acid in the reaction mixture. The mixture is thoroughly stirred to disperse the catalyst and is heated to the desired temperature which preferably is around the boiling point of the solution. After the desired temperature has been attained, the mixture is held at that temperature for a predetermined period of time to effect the desired extent of polymerization. The concentration of solvent in the mixture is then adjusted (if necessary to facilitate washing) and the mixture is washed with dilute acid to assist in keeping the ash content of the finished product low. Acids such as hydrochloric or sulfuric may be used for this purpose in concentrations of about 1% to 30%. The mixture is then filtered (preferably with the assistance of a commercial filter-aid) to remove the catalyst. The filtrate is then thoroughly washed with water to remove any remaining acids or other soluble materials. In case the polymerization is carried out on molten rosin, the treated rosin would be put into solution in an inert solvent, washed with dilute acid, filtered, and then washed with water. In either case the washed solution is next distilled or otherwise treated to separate the solvent. After such distillation or separation, the polymerized product is characterized by the presence of loosely-combined hydrohalic acid which would interfere with the subsequent processing of the product at elevated temperatures into such materials as ester gum. This loosely-combined hydrohalic acid is therefore desirably removed by any convenient means, such as by bringing the polymerized rosin to temperatures of from about 250° C. to 340° C., and sparging it by passing in steam or other inert gas or vapor to sweep out the liberated hydrohalic acid. After removal of this liberated acid, the product is characterized by exhibiting a higher melting point, a higher viscosity in solution, and greater resistance to oxidation than the original rosin.

Having described broadly the basic concepts of the present invention, certain examples are presented hereinafter to illustrate particular embodiments. These examples are in no way to be considered in a limiting sense. All parts and percentages in the specification and examples are by weight unless otherwise indicated.

*Example 1*

400 parts of metal free N gum rosin of R & B M. P. 81° C. was dissolved in 100 parts of mineral spirits and 16 parts of bauxite together with 3 parts of chlorine added. The solution was heated at 140–150° C. for 6 hours, diluted with solvent, washed with dilute HCl and three times with hot water. After filtering with the help of a filter-aid the solvent was removed with steam, the final temperature of the resin being 200° C.; grade H, M. P. 93.5° C.; A. N. 163; ash 0.12%.

In an example run exactly like the above without activating the bauxite with HCl the melting point of the resulting resin was only 82° C.

*Example 2*

400 parts of metal free K gum rosin of M. P. 83° C., acid number 167 was dissolved in 100 parts of acetic acid and 16 parts of fuller's earth together with 3 parts of chlorine added. After heating at 120–125° C. for 5 hours the solution was poured into mineral spirits, filtered, washed well with hot water and the solvent then removed with steam, the final temperature of the resin being 220° C.; grade H, M. P. 88.5° C.; acid number 170.

*Example 3*

400 parts of the rosin used in Example 1 was dissolved in 100 parts of mineral spirits and 20 parts of New Jersey clay together with 4 parts of chlorine added. The solution was heated at 140–150° C. for 12 hours, solvent added to dilute, washed with dilute HCl, filtered with the help of a filter-aid, and finally washed three times with water. The solvent was removed with steam, the final temperature of the resin being 200° C.; grade K, M. P. 90° C.; A. N. 163; ash 0.022%.

*Example 4*

400 parts of the rosin used in Example 1 was dissolved in 100 parts of mineral spirits and 20 parts of rottenstone together with 3 parts of chlorine were added to the solution which was then heated at 140–150° C. for 13 hours. After washing with dilute HCl and filtering, the solution was diluted with solvent and washed three times with water. The solvent was removed with steam, the final temperature of the resin being 200° C.; grade H, M. P. 95.5° C.; A. N. 161; ash 0.12%.

*Example 5*

400 parts of the rosin used in Example 1 was dissolved in 100 parts of mineral spirits and 20 parts of montmorillonite together with 4 parts chlorine added. The solution was heated at 140–150° C. for 12 hours, washed with dilute HCl, diluted with mineral spirits, filtered with the help of a filter-aid, and washed three times with water. The solvent was removed with steam, the final temperature of the resin being 200° C.; grade K, M. P. 86° C.; A. N. 161.

A portion of this rosin was steamed gently at 270–280° C. for 1 hour; grade M, M. P. 88° C.; A. N. 138.

*Example 6*

400 parts of the rosin used in Example 1 was dissolved in 100 parts of mineral spirits and 16 parts of bentonite together with 3 parts of chlorine added. The solution was heated at 140–150° C. for 12 hours, washed with dilute HCl, filtered with the help of a filter-aid, and washed three times with water. The solvent was removed with steam, the final temperature of the resin being 200° C.; grade M, M. P. 84° C.; A. N. 148; ash 0.11%.

*Example 7*

400 parts of the rosin used in Example 1 was dissolved in 100 parts of mineral spirits and 4 parts of rottenstone together with 4 parts of chlorine added. The solution was heated at 140–150° C. for 11 hours, washed with dilute HCl, diluted with solvent, filtered with the help of a filter-aid and finally washed three times with water. The solvent was removed with steam, the final temperature of the resin being 210° C.; grade K, M. P. 99.5° C.; A. N. 162.

*Blank*

400 parts of metal free N gum rosin of R & B M. P. 81° C. and acid number 167 was dissolved in 100 parts of mineral spirits and 2 parts of chlorine added at a temperature of about 75–80° C. The solution was heated at 140–150° C. for 6 hours, diluted with mineral spirits, and washed twice with water. The solvent was removed with steam, the final temperature of the resin being 200° C.; grade H, M. P. 80.5° C.; acid number 164. If the metal is not removed from the original rosin the above conditions yield a resin with a melting point as high as 92° C.

In the following claims, the term "rosin" is used in a generic sense to refer to the natural gum and wood rosins and to the rosin acids which compose said rosins.

Having now described the invention, what I claim is:

1. The method of polymerizing rosin which comprises the step of treating said rosin in liquid phase at temperatures between about 50° C. and 155° C. in the combined presence of about .2% to 5% of hydrohalic acid selected from the group consisting of hydrochloric acid and hydrobromic acid and an amount of between about .2% and 20% of an earth selected from the group consisting of fuller's earth, bentonite, rottenstone, montmorillonite, New Jersey clay, and bauxite, said treatment being carried out for at least one hour until substantial increase in the melting point of the rosin has been effected.

2. The method of polymerizing rosin which comprises the step of treating said rosin in liquid phase at temperatures between about 50° C. and 155° C. in the combined presence of both a hydrohalic acid selected from the group consisting of hydrochloric acid and hydrobromic acid and with an earth selected from the group consisting of fuller's earth, bentonite, rottenstone, New Jersey clay, montmorillonite, and bauxite, said acid being present in amounts between about .2% and 5% by weight of the rosin, and said earth being present in amounts between about .2% and 20% by weight of the rosin, said treatment being carried out for a period of between 1 and 100 hours until a substantial increase has been effected in the melting point of the rosin.

3. The method as claimed in claim 1 wherein said hydrohalic acid is produced in situ.

4. The method as claimed in claim 2 wherein said hydrohalic acid is produced in situ.

5. The method as claimed in claim 2 wherein said earth is present in amounts of between about 1% and 4%, and wherein said hydrohalic acid is present in amounts of between about 0.2% and 2%.

6. The method as claimed in claim 2 wherein said rosin in liquid phase consists of molten rosin.

7. The method as claimed in claim 2 wherein said rosin in liquid phase consists of a solution of rosin containing at least 30% rosin.

8. The method of polymerizing rosin which comprises the steps of: treating said rosin in liquid phase for a period of between about 1 and 100 hours at temperatures between about 50° C. and 155° C. in the combined presence of (1) from about .2% to about 20% of an earth selected from the group consisting of fuller's earth, bentonite, rottenstone, montmorillonite, New Jersey clay, and bauxite and (2) from about .2% to 5% of a hydrohalic acid selected from the group consisting of hydrochloric acid and hydrobromic acid until a substantial increase has been effected in the melting point of the rosin; thereafter thinning said treated rosin with solvent to permit the washing of the solution so formed; washing said rosin solution with dilute acids; filtering said washed rosin to remove the water; again washing the rosin solution with water; recovering the rosin from said solution; and sparging said rosin at temperatures between about 250° C. and 340° C.

9. The method of polymerizing rosin which comprises the step of treating said rosin in liquid phase at temperatures between about 120° C. and 155° C. in the combined presence of about .2% to 5% of hydrohalic acid selected from the group consisting of hydrochloric acid and hydrobromic acid and an amount of between about .2% and 20% of an earth selected from the group consisting of fuller's earth, bentonite, rottenstone, montmorillonite, New Jersey clay, and bauxite, said treatment being carried out for at least one hour until substantial increase in the melting point of the rosin has been effected.

10. The method of polymerizing rosin which comprises the step of treating said rosin in liquid phase at temperatures between about 120° C. and 155° C. in the combined presence of both a hydrohalic acid selected from the group consisting of hydrochloric acid and hydrobromic acid and with an earth selected from the group consisting of fuller's earth, bentonite, rottenstone, New Jersey clay, montmorillonite, and bauxite, said acid being present in amounts between about .2% and 5% by weight of the rosin, and said earth being present in amounts between about .2% and 20% by weight of the rosin, said treatment being carried out for a period of between about 1 and 30 hours until a substantial increase has been effected in the melting point of the rosin.

11. The method as claimed in claim 9 wherein said hydrohalic acid is produced in situ.

12. The method as claimed in claim 10 wherein said hydrohalic acid is produced in situ.

13. The method as claimed in claim 10 wherein said earth is present in amounts of between about 1% and 4%, and wherein said hydrohalic acid is present in amounts of between about 0.2% and 2%.

14. The method as claimed in claim 10 wherein said rosin in liquid phase consists of molten rosin.

15. The method as claimed in claim 10 wherein said rosin in liquid phase consists of a solution of rosin containing at least 30% rosin.

16. The method of polymerizing rosin which comprises the steps of: treating said rosin in liquid phase for a period of between about 1 and 30 hours at temperatures between about 120° C. and 155° C. in the combined presence of (1) from about .2% to about 20% of an earth selected from the group consisting of fuller's earth, bentonite, rottenstone, montmorillonite, New Jersey clay, and bauxite, and (2) from about .2% to 5% of a hydrohalic acid selected from the group consisting of hydrochloric acid and hydrobromic acid until a substantial increase has been effected in the melting point of the rosin; thereafter thinning said treated rosin with solvent to permit the washing of the solution so formed; washing said rosin solution with dilute acids; filtering said washed rosin to remove the earth; again washing the rosin solution with water; recovering the rosin from said solution; and sparging said rosin at temperatures between about 250° C. and 350° C.

BURT L. HAMPTON.

REFERENCES CITED

The following references are of record in the file of this patent:

UNITED STATES PATENTS

| Number | Name | Date |
| --- | --- | --- |
| 2,191,309 | Borglin | Feb. 20, 1940 |
| 2,263,915 | Borglin | Nov. 25, 1941 |
| 2,281,078 | Price et al. | Apr. 28, 1942 |
| 2,320,795 | Pickett | June 1, 1943 |